United States Patent
Suzuki et al.

(10) Patent No.: US 10,625,713 B2
(45) Date of Patent: Apr. 21, 2020

(54) IN-VEHICLE DEVICE, RECORDING MEDIUM, AND KEYLESS ENTRY SYSTEM

(71) Applicant: ALPS ALPINE CO., LTD., Tokyo (JP)

(72) Inventors: Yasuhiro Suzuki, Miyagi (JP); Satoshi Hayasaka, Miyagi (JP); Satoshi Nakajima, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 0 days.

(21) Appl. No.: 16/442,720

(22) Filed: Jun. 17, 2019

(65) Prior Publication Data

US 2020/0010052 A1    Jan. 9, 2020

(30) Foreign Application Priority Data

Jul. 6, 2018 (JP) .................. 2018-129340

(51) Int. Cl.
*B60R 25/00* (2013.01)
*G05B 19/00* (2006.01)
(Continued)

(52) U.S. Cl.
CPC .............. *B60R 25/34* (2013.01); *B60R 25/01* (2013.01); *B60R 25/24* (2013.01); *E05B 49/00* (2013.01);
(Continued)

(58) Field of Classification Search
CPC ......... B60R 25/34; B60R 25/01; B60R 25/24; E05B 49/00; G07C 9/00182; H04W 12/06; H04W 24/04
See application file for complete search history.

(56) References Cited

U.S. PATENT DOCUMENTS 8,044,771 B2 * 10/2011 Nakajima ............... B60R 25/24
340/426.13
8,130,076 B2 * 3/2012 Nakajima ............. B60R 25/245
340/426.16
(Continued)

FOREIGN PATENT DOCUMENTS

JP    2010-189986    9/2010
JP    2015-060535    3/2015

*Primary Examiner* — Quang Pham
(74) *Attorney, Agent, or Firm* — IPUSA, PLLC

(57) ABSTRACT

An in-vehicle device includes transmitting antennas, an in-vehicle device transmitter configured to transmit request signals from the respective transmitting antennas, an in-vehicle device receiver configured to receive, from a portable device, an answer signal that includes received signal strengths of the respective request signals, and an in-vehicle device controller configured to calculate a distance from the portable device to each of a plurality of areas, based on both the received signal strengths of the respective request signals included in the answer signal and reference values for the request signals, and to identify an area to which the portable device belongs based on the distance. In a case where there is a request signal whose received signal strength is not included in the answer signal, the in-vehicle device controller calculates the distance by utilizing a corresponding reference value for the request signal as the received signal strength of the request signal.

7 Claims, 9 Drawing Sheets

(51) Int. Cl.
*G05B 23/00* (2006.01)
*G06F 7/00* (2006.01)
*G06F 7/04* (2006.01)
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)
*B60R 25/34* (2013.01)
*B60R 25/01* (2013.01)
*B60R 25/24* (2013.01)
*G07C 9/00* (2020.01)
*H04W 12/06* (2009.01)
*H04W 24/04* (2009.01)
*E05B 49/00* (2006.01)

(52) U.S. Cl.
CPC ........ *G07C 9/00182* (2013.01); *H04W 12/06* (2013.01); *H04W 24/04* (2013.01)

(56) References Cited

U.S. PATENT DOCUMENTS

| | | | | |
|---|---|---|---|---|
| 9,114,720 | B2* | 8/2015 | Oman | B60L 11/1829 |
| 9,214,083 | B2* | 12/2015 | Lim | G08C 17/02 |
| 9,554,286 | B2* | 1/2017 | Ghabra | H04W 24/00 |
| 9,679,430 | B2* | 6/2017 | O'Brien | G07C 9/00309 |
| 9,682,684 | B2* | 6/2017 | Miyazawa | B60R 25/245 |
| 9,852,560 | B2* | 12/2017 | Bauman | G07C 9/00309 |
| 9,919,680 | B2* | 3/2018 | Miyazawa | B60R 25/24 |
| 2001/0005170 | A1* | 6/2001 | Heide | B60R 25/24 340/5.61 |
| 2002/0025823 | A1* | 2/2002 | Hara | B60R 25/24 455/456.5 |
| 2004/0183714 | A1* | 9/2004 | Yamashita | B60R 25/24 342/70 |
| 2006/0224290 | A1* | 10/2006 | Nakashima | B60R 25/24 701/49 |
| 2006/0267407 | A1* | 11/2006 | Nagaoka | B60R 25/24 307/10.1 |
| 2011/0057817 | A1* | 3/2011 | Proefke | G01S 13/74 340/989 |
| 2016/0332597 | A1* | 11/2016 | Tokunaga | B60R 25/24 |
| 2017/0076524 | A1* | 3/2017 | Yoshihara | B60R 16/02 |
| 2017/0120868 | A1* | 5/2017 | Watanabe | G01S 13/74 |
| 2017/0190317 | A1* | 7/2017 | Hamada | B60R 25/24 |
| 2017/0203721 | A1* | 7/2017 | Hamada | G01S 5/0252 |
| 2017/0232933 | A1* | 8/2017 | Nishidai | B60R 16/037 340/5.61 |
| 2017/0298659 | A1* | 10/2017 | Watanabe | E05B 77/465 |
| 2018/0106882 | A1* | 4/2018 | Kanaga | G01S 5/0284 |
| 2018/0361803 | A1* | 12/2018 | Saburi | B60C 23/0416 |
| 2018/0370487 | A1* | 12/2018 | Ishikawa | B60R 25/01 |
| 2019/0020988 | A1* | 1/2019 | Matsuoka | B60R 25/245 |
| 2019/0039572 | A1* | 2/2019 | Tani | B60R 25/10 |
| 2019/0101637 | A1* | 4/2019 | Kawagishi | H04W 4/48 |
| 2019/0219678 | A1* | 7/2019 | Miyazawa | H04B 17/318 |
| 2020/0010052 | A1* | 1/2020 | Suzuki | B60R 25/34 |
| 2020/0017073 | A1* | 1/2020 | Suzuki | H04W 4/48 |
| 2020/0017074 | A1* | 1/2020 | Nakajima | B60R 25/01 |

* cited by examiner

FIG.6

| ANTENNA ID | RECEIVED SIGNAL STRENGTH x |
|---|---|
| A221 | NULL |
| A222 | x2 |
| A223 | x3 |
| A224 | x4 |
| A225 | x5 |

FIG.7

| ANTENNA ID | RECEIVED SIGNAL STRENGTH x |
|---|---|
| A222 | x2 |
| A223 | x3 |
| A224 | x4 |
| A225 | x5 |

US 10,625,713 B2

IN-VEHICLE DEVICE, RECORDING MEDIUM, AND KEYLESS ENTRY SYSTEM

CROSS-REFERENCE TO RELATED APPLICATIONS

This application is based on and claims priority to Japanese Patent Application No. 2018-129340, filed on Jul. 6, 2018, the entire contents of which are incorporated herein by reference.

BACKGROUND OF THE INVENTION

1. Field of the Invention

The disclosures herein relate to an in-vehicle device, a recording medium, and a keyless entry system.

2. Description of the Related Art

Conventionally, keyless entry systems that include in-vehicle devices installed in vehicles and portable devices carried by users have been utilized. In the keyless entry systems, in order to control turning on or off of lamps and locking and unlocking of a vehicle, it is important to identify the location of a portable device (a user) with respect to the vehicle. Conventionally, a method for identifying the location of a portable device with respect to a vehicle has been proposed. In the conventional method, an in-vehicle device transmits request signals from a plurality of respective transmitting antennas, the portable device measures received signal strength indicator (RSSI) of each of the request signals, and transmits an answer signal that includes the received signal strengths, and the in-vehicle device identifies the location of the portable device based on the received signal strengths included in the answer signal.

However, in the above conventional method, if the portable device fails to receive a request signal due to a malfunction or a communication failure of a transmitting antenna, a received signal strength of the request signal is not included in an answer signal, thus causing the in-vehicle device to be unable to identify the location of the portable device. In other words, even if other request signals can be received, the in-vehicle device is unable to identify the location of the portable device.

RELATED-ART DOCUMENTS

Patent Documents

[PATENT DOCUMENT 1] Japanese Laid-Open Patent Publication No. 2010-189986
[PATENT DOCUMENT 2] Japanese Laid-Open Patent Publication No. 2015-060535

SUMMARY OF THE INVENTION

It is a general object of the present invention to provide a keyless entry system in which even if a received signal strength of any request signal is not obtained, the location of a portable device can be identified based on received signal strengths of other request signals.

According to an embodiment, an in-vehicle device includes a plurality of transmitting antennas, an in-vehicle device transmitter configured to transmit request signals via the plurality of respective transmitting antennas, an in-vehicle device receiver configured to receive, from a portable device, an answer signal that includes received signal strengths of the respective request signals that have been transmitted from the plurality of respective transmitting antennas, and an in-vehicle device controller configured to calculate a distance from the portable device to each of a plurality of areas, based on both the received signal strengths of the respective request signals included in the answer signal and reference values for the received signal strengths of the respective request signals, the reference values being set for the plurality of respective areas, and to identify an area to which the portable device belongs from the plurality of areas based on the distance. In a case where there is a request signal whose received signal strength is not included in the answer signal, the in-vehicle device controller calculates the distance by utilizing a corresponding reference value for the request signal as the received signal strength of the request signal, the corresponding reference value being from among the reference values.

BRIEF DESCRIPTION OF THE DRAWINGS

Other objects and further features of the present invention will be apparent from the following detailed description when read in conjunction with the accompanying drawings, in which:

FIG. 6 is a table illustrating an example of received signal strengths x included in an answer signal A;

FIG. 7 is a table illustrating an example of received signal strengths x included in an answer signal A;

DESCRIPTION OF THE PREFERRED EMBODIMENTS

In the following, embodiments of the present invention will be described with reference to the accompanying drawings. In the specification and drawings, elements having substantially the same functions or configurations are referred to by the same numerals, and a duplicate description thereof will be omitted.

Figure 1:
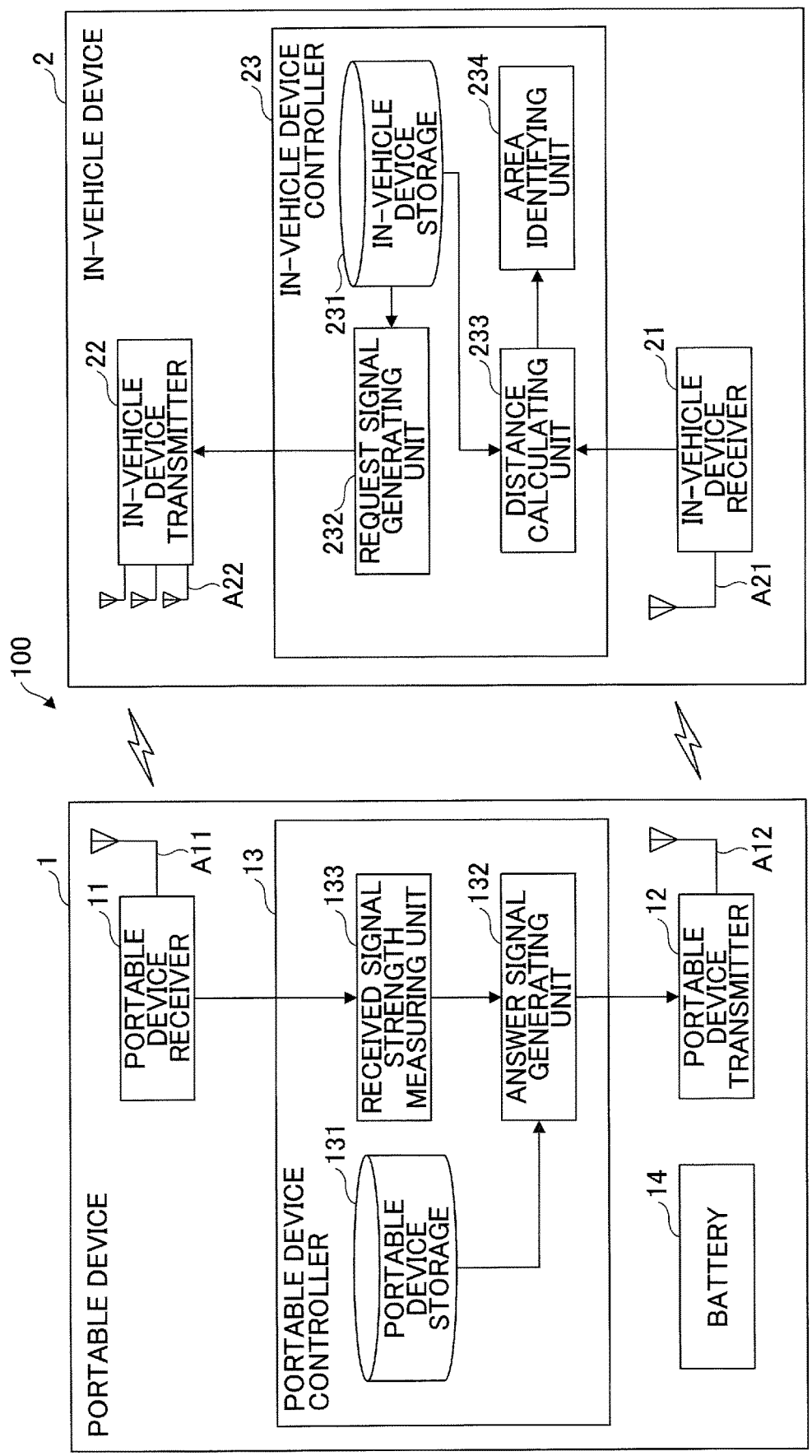
FIG. 1 is a diagram illustrating an example of a configuration of a keyless entry system.

A keyless entry system 100 according to an embodiment will be described with reference to FIGS. 1 to 10. First, a configuration of the keyless entry system 100 will be described. FIG. 1 is a diagram illustrating an example of the configuration of the keyless entry system 100. The keyless entry system 100 of FIG. 1 includes a portable device 1 and an in-vehicle device 2.

First, a hardware configuration of the portable device 1 will be described. The portable device 1 is a wireless terminal that wirelessly communicates with the in-vehicle device 2, and is carried by a user (a driver, for example) of the keyless entry system 100. The portable device 1 may be a dedicated terminal or a portable terminal such as a smartphone or a tablet terminal. The portable device 1 illustrated in FIG. 1 includes a receiving antenna A11, a portable device receiver 11, a transmitting antenna A12, a portable device transmitter 12, a portable device controller 13, and a battery 14.

The receiving antenna A11 is an antenna connected to the portable device receiver 11. The receiving antenna A11 receives a wireless signal transmitted from the in-vehicle device 2, converts the received wireless signal into an electrical signal, and inputs the electrical signal into the portable device receiver 11. The receiving antenna A11 may be a three-axis antenna having three antennas arranged perpendicular to each other, but is not limited thereto.

The portable device receiver 11 is a receiving circuit that receives a wireless signal transmitted from the in-vehicle device 2 via the receiving antenna A11, and is connected to the portable device controller 13. The wireless signal received by the portable device receiver 11 includes a request signal R wirelessly transmitted from the in-vehicle device 2. The request signal will be described later. The portable device receiver 11 includes, for example, a low-noise amplifier, a filter, a mixer, and a demodulator circuit. When the portable device receiver 11 receives a wireless signal via the receiving antenna A11, the portable device receiver 11 performs predetermined signal processing on an electrical signal converted by the receiving antenna A11, and inputs the electrical signal into the portable device controller 13.

The transmitting antenna A12 is an antenna connected to the portable device transmitter 12. The transmitting antenna A12 converts an electrical signal input from the portable device transmitter 12 into a wireless signal, and transmits the wireless signal to the in-vehicle device 2. The transmitting antenna A12 may be a three-axis antenna having three antennas arranged perpendicular to each other, but is not limited thereto.

The portable device transmitter 12 is a transmitting circuit that transmits a wireless signal to the in-vehicle device 2 via the transmitting antenna A12, and is connected to the portable device controller 13. The wireless signal transmitted from the portable device transmitter 12 includes an answer signal A. The answer signal A is a wireless signal for identifying the location of the portable device 1 (the user) with respect to the in-vehicle device 2 (the vehicle), and includes signal strengths x of request signals R received at the portable device receiver 11. As will be described below, the location of the portable device 1 with respect to the in-vehicle device 2 is identified based on the signal strengths x of the received request signals R included in the answer signal A. Examples of the wireless signal transmitted from the portable device transmitter 12 include, but are not limited to, a 315 MHz ultra-high frequency (UHF) signal and a 2.4 GHz Bluetooth (registered trademark) signal. The portable device transmitter 12 includes for example, a modulator, a mixer, a filter, and a power amplifier. When an electrical signal is input from the portable device controller 13, the portable device transmitter 12 performs predetermined processing such as modulation of the electrical signal, and wirelessly transmits the electrical signal via the transmitting antenna A12.

The receiving antenna A11 and the transmitting antenna A12 may be separate antennas. Alternatively, one antenna may be shared between the receiving antenna A11 and the transmitting antenna A12. The portable device 1 may include one or more receiving antennas A11 and one or more transmitting antennas A12. Further, the portable device receiver and the portable device transmitter 12 may be separate integrated circuits (ICs) or may be integrated into a wireless module (such as a Bluetooth module).

The portable device controller 13 is hardware for controlling the entire operation of the portable device 1, and includes a central processing unit (CPU), a read-only memory (ROM), and a random-access memory (RAM). The CPU controls components of the portable device 1 and implements functions of the portable device controller 13 by executing programs. The programs executed by the CPU may be recorded on any computer-readable recording medium, such as a compact disc (CD), a DVD, or a flash memory. The ROM stores the programs executed by the CPU and various types of data. The RAM provides a working area for the CPU. The portable device controller 13 is, for example, a microcontroller, but is not limited thereto.

The battery 14 provides power to the portable device receiver 11, the portable device transmitter 12, and the portable device controller 13.

The configuration of the portable device 1 is not limited to the example illustrated in FIG. 1. For example, if the portable device 1 is a dedicated terminal, the portable device 1 may include a locking button and an unlocking button that allow the user to manually lock and unlock the vehicle. In addition, if the portable device 1 is a portable terminal, the portable device 1 may include input devices such as a touch panel and a microphone and output devices such as a liquid crystal display and a speaker.

Next, a hardware configuration of the in-vehicle device 2 will be described. The in-vehicle device 2 is a wireless terminal that wirelessly communicates with the portable device 1, and is installed in a vehicle. The in-vehicle device 2 is connected to an electronic control unit (ECU) of the vehicle via an in-vehicle network such as a controller area network (CAN) or a local interconnect network (LIN), and controls the vehicle in response to a wireless signal transmitted from the portable device 1. In addition, the in-vehicle device 2 is supplied with power from a battery of the vehicle. The in-vehicle device 2 illustrated in FIG. 1 includes a receiving antenna A21, an in-vehicle device receiver 21, a plurality of transmitting antennas A22, an in-vehicle device transmitter 22, and an in-vehicle device controller 23.

The receiving antenna A21 is an antenna connected to the in-vehicle device receiver 21. The receiving antenna A21 receives a wireless signal transmitted from the portable device 1, converts the received wireless signal into an electrical signal, and inputs the electrical signal into the in-vehicle device receiver 21. The receiving antenna A21 may be a three-axis antenna having three antennas arranged perpendicular to each other, but is not limited thereto.

The in-vehicle device receiver 21 is a receiving circuit that receives a wireless signal transmitted from the portable device 1 via the receiving antenna A21, and is connected to the in-vehicle device controller 23. The wireless signal received by the in-vehicle device receiver 21 includes an answer signal A wirelessly transmitted from the portable device 1. The in-vehicle device receiver 21 includes, for example, a low-noise amplifier, a filter, a mixer, and a demodulator circuit. When the in-vehicle device receiver 21 receives a wireless signal via the receiving antenna A21, the in-vehicle device receiver 21 performs predetermined signal processing on an electrical signal converted by the receiving antenna A21, and inputs the electrical signal into the in-vehicle device controller 23.

The transmitting antennas A22 are connected to the in-vehicle device transmitter 22. Each of the transmitting antennas A22 converts an electrical signal input from the in-vehicle device transmitter 22 into a wireless signal, and transmits the wireless signal to the portable device 1. The transmitting antennas A22 may be a three-axis antenna having three antennas arranged perpendicular to each other, but is not limited thereto. In the example of FIG. 1, the in-vehicle device 2 includes three transmitting antennas A22; however, the in-vehicle device 2 may include two transmitting antennas A22 or four or more transmitting antennas A22.

The in-vehicle device transmitter 22 is a transmitting circuit that transmits a wireless signal to the portable device 1 via the transmitting antennas A22, and is connected to the in-vehicle device controller 23. The wireless signal transmitted from the in-vehicle device transmitter 22 includes a request signal R. The request signal R is a wireless signal for identifying the location of the portable device 1 (the user) with respect to the in-vehicle device 2 (the vehicle). The request signal R includes a measurement portion (a portion whose transmitted signal strength is constant), and a signal strength x of the received measurement portion is measured. As will be described below, the location of the portable device 1 with respect to the in-vehicle device 2 is identified based on signal strengths x of received request signals R measured by the portable device 1. The portable device 1 measures signal strengths x of received measurement portions included in request signals R as signal strengths x of the received request signals R. Examples of the wireless signal transmitted from the in-vehicle device transmitter 22 include, but are not limited to, a 125 kHz low-frequency (LF) signal and a 2.4 GHz Bluetooth (registered trademark) signal. The in-vehicle device transmitter 22 includes for example, a modulator, a mixer, a filter, and a power amplifier. When an electrical signal is input from the in-vehicle device controller 23, the in-vehicle device transmitter 22 performs predetermined processing such as modulation of the electrical signal, and wirelessly transmits the electrical signal via the transmitting antennas A22.

The receiving antenna A21 and the transmitting antennas A22 may be separate antennas. Alternatively, one antenna may be shared between the receiving antenna A21 and the transmitting antennas A22. The in-vehicle device 2 may include one or more receiving antennas A21. Further, the in-vehicle device receiver 21 and the in-vehicle device transmitter 22 may be separate integrated circuits (ICs) or may be integrated into a wireless module (such as a Bluetooth module).

The in-vehicle device controller 23 is hardware for controlling the entire operation of the in-vehicle device 2, and includes a CPU, ROM, and a RAM. The CPU controls components of the in-vehicle device 2 and implements functions of the in-vehicle device controller 23 by executing programs. The programs executed by the CPU may be recorded on any computer-readable recording medium, such as a CD, a DVD, or a flash memory. The ROM stores the programs executed by the CPU and various types of data. The RAM provides a working area for the CPU. The in-vehicle device controller 23 is, for example, a microcontroller, but is not limited thereto.

The configuration of the in-vehicle device 2 is not limited to the example illustrated in FIG. 1. For example, the in-vehicle device 2 may include a battery for supplying power to the in-vehicle device receiver 21, the in-vehicle device transmitter 22, and the in-vehicle device controller 23. In addition, in the example of FIG. 1, the in-vehicle device 2 includes the one in-vehicle device transmitter 22 connected to the plurality of transmitting antennas A22, but may include a plurality of in-vehicle device transmitters 22 connected to the plurality of respective transmitting antennas A22.

Figure 2:
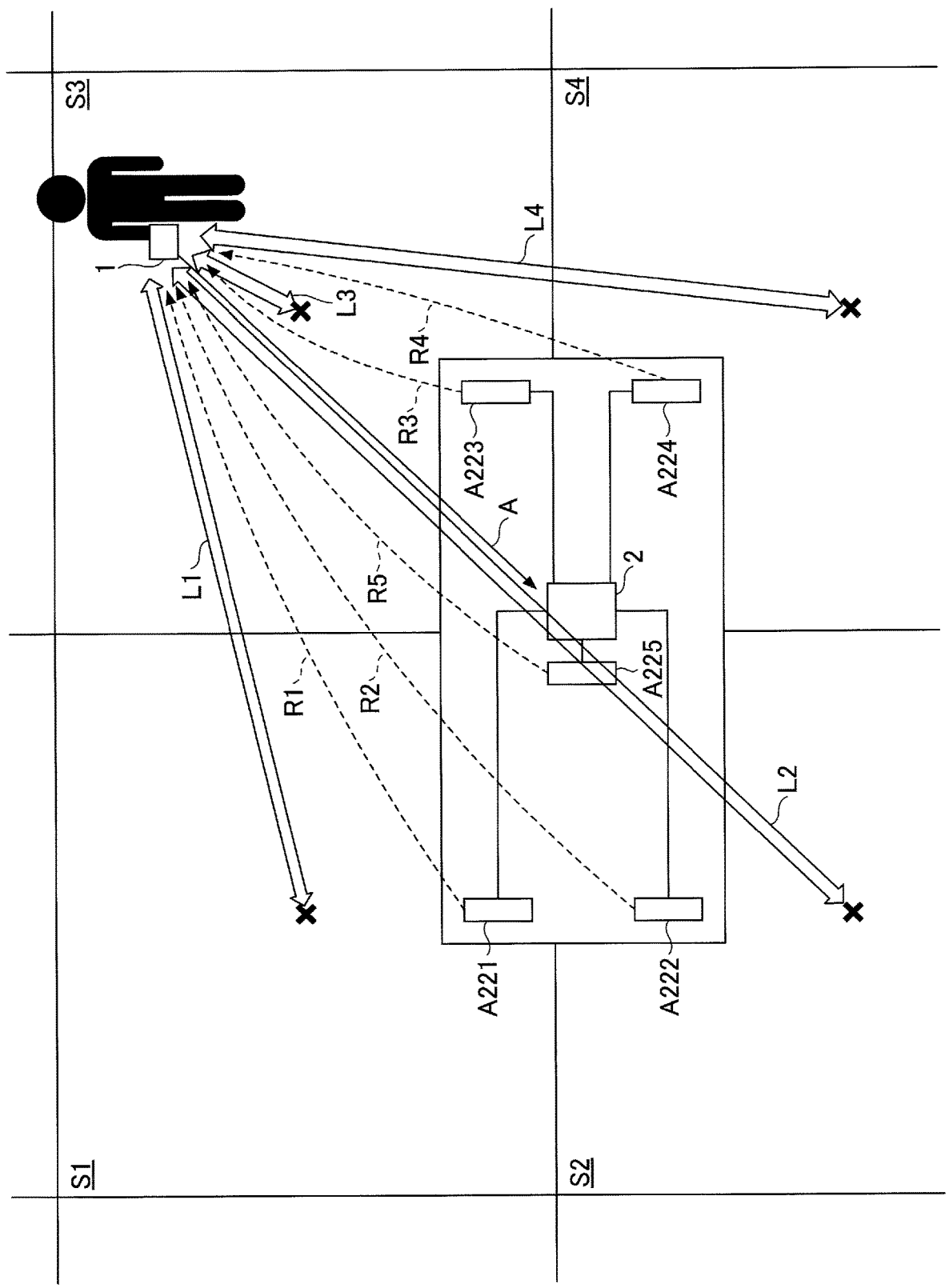
FIG. 2 is a diagram illustrating an overview of the operation of the keyless entry system.

Next, an overview of the operation of the keyless entry system 100 will be described. FIG. 2 is a diagram illustrating an overview of the operation of the keyless entry system 100. In the example of FIG. 2, the in-vehicle device 2 includes four transmitting antennas A221 to A224 disposed at the four corners of the vehicle, and a transmitting antenna A225 disposed at the center of the vehicle. The other components of the in-vehicle device 2 are collectively arranged at the center of the vehicle, and are connected to the transmitting antennas A221 to A225 via the in-vehicle network. In addition, a three-dimensional space within a given distance from the vehicle is divided to form several tens of areas around the vehicle without any gaps. Each of the areas has one representative point. In the example of FIG. 2, for convenience of explanation, four areas S1 to S4 are illustrated. The areas S1 to S4 are preliminarily determined areas in order to identify the location of the portable device 1. Hereinafter, the transmitting antennas A221 to A225 may be, if not distinguished, referred to as transmitting antenna(s) A22, and the areas S1 to S4 may be, if not distinguished, referred to as area(s) S.

In the present embodiment, the in-vehicle device 2 transmits request signals R1 to R5 from the transmitting antennas A221 to A225, respectively. When the portable device 1 has received the request signal R1, the portable device 1 measures a signal strength x1 of the received request signal R1. The same applies to the request signals R2 to R5. The portable device 1 receives request signals R over a predetermined period of time, and transmits an answer signal A that includes signal strengths x of the request signals R received over the predetermined period of time. When the in-vehicle device 2 has received the answer signal A, the in-vehicle device 2 calculates distances L1 to L4 from the portable device 1 to the areas S1 to S4 based on the received signal strengths x included in the answer signal A. As used herein, a distance to an area S means a distance to a representative point of the area S.

For example, the in-vehicle device 2 calculates Mahalanobis distances MD as the distances L to the respective areas S. The Mahalanobis distances MD from the portable device 1 to the areas S are calculated by the following formulas.

$$MD^2 = [x_1 - \mu_1 \ \ldots \ x_n - \mu_n] \begin{bmatrix} r_{11} & \cdots & r_{n1} \\ \vdots & \ddots & \vdots \\ r_{1n} & \cdots & r_{nn} \end{bmatrix}^{-1} \begin{bmatrix} x_1 - \mu_1 \\ \vdots \\ x_n - \mu_1 \end{bmatrix} \quad (1)$$

$$r_{ij} = \frac{1}{m} \sum_{p=1}^{m} (X_{ip} \times X_{jp}) \quad (2)$$

$$X_{ip} = \frac{x_{ip} - \mu_i}{\sigma_i} \quad (3)$$

In the formulas (1) to (3), n represents the number of transmitting antennas A22 included in the in-vehicle device 2. In the example of FIG. 2, n is 5. $x_i$ represents a signal strength xi of a received request signal Ri, which has been transmitted from an $i^{th}$ transmitting antenna A22i. m represents the number of signal strengths xi of the received request signal Ri that have been measured before the vehicle is put on the market by a measuring instrument (such as the most commonly used portable instrument) belonging to a corresponding area S. $x_{ip}$ represents a signal strength xi of the received request signal Ri that has been measured $p^{th}$ (p=1 to m) by the measuring instrument belonging to the area S. $\mu_i$ represents an average value of the m number of signal strengths $x_{ip}$ ($\mu_i = \Sigma x_{ip}/m$) preliminarily measured by the measuring instrument belonging to the area S. $\mu_i$ corresponds to a reference value for the signal strength xi of the received request signal Ri, which is preliminarily set for the area S. $\sigma_i$ represents the standard deviation of the received signal strength $x_{ip}$ preliminarily measured by the measuring instrument belonging to the area S. If the distances L are the Mahalanobis distances MD, $\mu_i$ and $r_{ij}$ of all transmitting antennas A22i are preliminarily stored in the ROM of the in-vehicle device controller 23 as reference values and coefficients to be used to calculate the distances L from the portable device 1 to the areas S. It should be noted that parameters such as m may be prepared beforehand for each vehicle production lot or for each vehicle.

In the example of FIG. 2, a reference value $\mu_i$ and a coefficient $r_{ij}$ for the area S1 and a received signal strength x included in an answer signal A are substituted into the formula (1) to calculate the distance L1 (the Mahalanobis distance MD) from the portable device 1 to the area S1. The same applies to the distances L2 to L4.

Further, as the distances L to the areas S, the in-vehicle device 2 may calculate Euclidean distances ED. The Euclidean distances ED from the portable device 1 to the areas S are calculated by the following formula.

$$ED^2 = (x_1-\mu_1)^2 + (x_2-\mu_2)^2 + \ldots + (x_n-\mu_n)^2 \quad (4)$$

In the formula (4), $\mu_i$ represents the same as the above. If the distances L are the Euclidean distances ED, $\mu_i$ values of all the transmitting antennas A22i are preliminarily stored in the ROM of the in-vehicle device controller 23 as reference values to be used to calculate the distances L to the respective areas S.

In the example of FIG. 2, the in-vehicle device 2 calculates a distance L1 (a Euclidean distance ED) from the portable device 1 to the area S1 by substituting a reference value $\mu_i$ and a received signal strength x included in an answer signal A into the formula (4). The same applies to the distances L2 to L4.

Once the in-vehicle device 2 calculates the distances L1 to L4 from the portable device 1 to the areas S1 to S4, the in-vehicle device 2 identifies an area S whose distance L is minimal from the areas S1 to S4, as an area S to which the portable device 1 belongs (namely, as the location of the portable device 1). In the example of FIG. 2, the area S3 is identified as the area S to which the portable device 1 belongs. It should be noted that when the minimal distance L is equal to or exceeds a threshold Lth, the in-vehicle device 2 may determine that the portable device 1 does not belong to any of the areas S.

Furthermore, if the answer signal A includes signal strengths x1 to x5 of all the received request signals R1 to R5, the in-vehicle device 2 can accurately calculate the distances L1 to L4 by using the above method. However, if the transmitting antenna A221 is unable to receive the signal strength x1 due to a malfunction or a communication failure of the transmitting antenna A221, the answer signal A does not include the signal strength x1 of the request signal R1 (a value of the signal strength x1 included in the answer signal A becomes a null), thus causing the in-vehicle device 2 to be unable to calculate the distances L1 to L4 by using the above method.

In such a case, as a first approach to calculate the distances L1 to L4, separately preparing another method (an algorithm) for calculating the distances L1 to L4 without using the signal strength x1 may be considered. However, with the first approach, multiple methods are required to be prepared to calculate the distances L, which would be time-consuming.

As a second approach, a method for substituting the previous value of the signal strength x1 or 0 for the signal strength x1 may be considered. The second approach is less time-consuming as compared to the first approach. However, because the term $(x_1-\mu_1)$ indicating a difference between the signal strength x1 and the reference value $\mu_i$ remains (does not become zero) in the formulas (1) or (4), the calculation amount does not decrease even though there is no signal strength x1.

In light of the above, according to the present embodiment, if the answer signal A does not include the signal strength x1 of the request signal R1, the in-vehicle device 2 calculates the distance L1 by substituting the reference value $\mu_i$, which is preliminarily set for the area S1, for the signal strength x1. The same applies to the distances L2 to L4, and reference values $\mu_i$ set for the areas S2 to S4 are substituted for respective signal strengths xi. Namely, if a signal strength xi of a received request signal Ri is not included in the answer signal A, the in-vehicle device 2 calculates a distance L from the portable device 1 to an area Sj by substituting a reference value $\mu_i$ set for the area Sj for the signal strength xi of the received request signal Ri.

Accordingly, in the formula (1) or the formula (4), the term $(x_i-\mu_i)$ indicating a difference between the received signal strength xi that was not included in the answer signal A and the reference value $\mu_i$ disappears (becomes 0). Thus, the amount of calculation for the distances L decreases, and the processing speed can be improved. In addition, as there is no need to use multiple methods for calculating the distances L, the calculation can be easily implemented.

In the above example, the Mahalanobis distances MD and the Euclidean distances ED have been described as the distances L; however, the distances L are not limited to the Mahalanobis distances MD and the Euclidean distances ED. The in-vehicle device 2 may use any method to calculate the distances L based on signal strengths xi of received request signals Ri. Further, the number and the arrangement of the transmitting antennas A22 and the areas S are not limited to the example of FIG. 2. In addition, in the example of FIG. 2, the in-vehicle device 2 includes the one in-vehicle device transmitter 22; however, the in-vehicle device 2 may include a plurality of in-vehicle device transmitters 22 provided for the respective transmitting antennas A22. Further, the transmitting antennas A22 and other components may be connected wirelessly or via a dedicated cable instead of the in-vehicle network.

Next, a functional configuration of the portable device controller 13 will be described. The portable device controller 13 of FIG. 1 includes a portable device storage 131, an answer signal generating unit 132, and a received signal strength measuring unit 133. These functions are implemented by causing the CPU of the portable device controller 13 to execute a program and work with other hardware.

The portable device storage 131 is provided in at least one of the ROM and the RAM of the portable device controller 13. The portable device storage 131 stores a portable device ID that is identification information of the portable device 1, an in-vehicle device ID that is identification information of the in-vehicle device 2 associated with the portable device 1, data for wirelessly communicating with the in-vehicle device 2, and other data. The portable device ID and the in-vehicle device ID may be MAC addresses, but are not limited thereto.

The answer signal generating unit 132 generates an answer signal A (an electrical signal) that includes signal strengths x of request signals R received at the portable device receiver 11 over the predetermined period of time, and the answer signal generating unit 132 inputs the generated answer signal A into the portable device transmitter 12.

The received signal strength measuring unit 133 measures the signal strengths x of the request signals R received at the portable device receiver 11, and inputs the measured signal strengths x of the received request signals R into the answer signal generating unit 132.

Next, a functional configuration of the in-vehicle device controller 23 will be described. The in-vehicle device controller 23 of FIG. 1 includes an in-vehicle device storage 231, a request signal generating unit 232, a distance calculating unit 233, and an area identifying unit 234. These functions are implemented by causing the CPU of the in-vehicle device controller 23 to execute a program and work with other hardware.

The in-vehicle device storage 231 is provided in at least one of the ROM and the RAM of the in-vehicle device controller 23. The in-vehicle device storage 231 stores an in-vehicle device ID that is identification information of the in-vehicle device 2, a portable device ID that is identification information of the portable device 1 associated with the in-vehicle device 2, data for wirelessly communicating with the portable device 1, antenna IDs that are identification information of the transmitting antennas A22, data (a reference value and a coefficient set for each area S) used to calculate distances L, and other data.

The request signal generating unit 232 generates a request signal R (an electrical signal) for each predetermined period of time, and inputs the generated request signal R into the in-vehicle device transmitter 22.

The distance calculating unit 233 calculates distances L from the portable device 1 to areas S, based on received signal strengths xi included in an answer signal A received at the in-vehicle device receiver 21 and reference values $\mu_i$ set for the respective areas S. The distances L are calculated as described above. The distance calculating unit 233 inputs the calculated distances L into the area identifying unit 234.

The area identifying unit 234 identifies an area S to which the portable device 1 belongs (namely, the location of the portable device 1) based on the distances L from the portable device 1 to the areas S.

Next, an operation of the keyless entry system 100 according to the present embodiment will be described. In the following, a standard for wireless communication between the portable device 1 and the in-vehicle device 2 is assumed to be Bluetooth.

Figure 3:
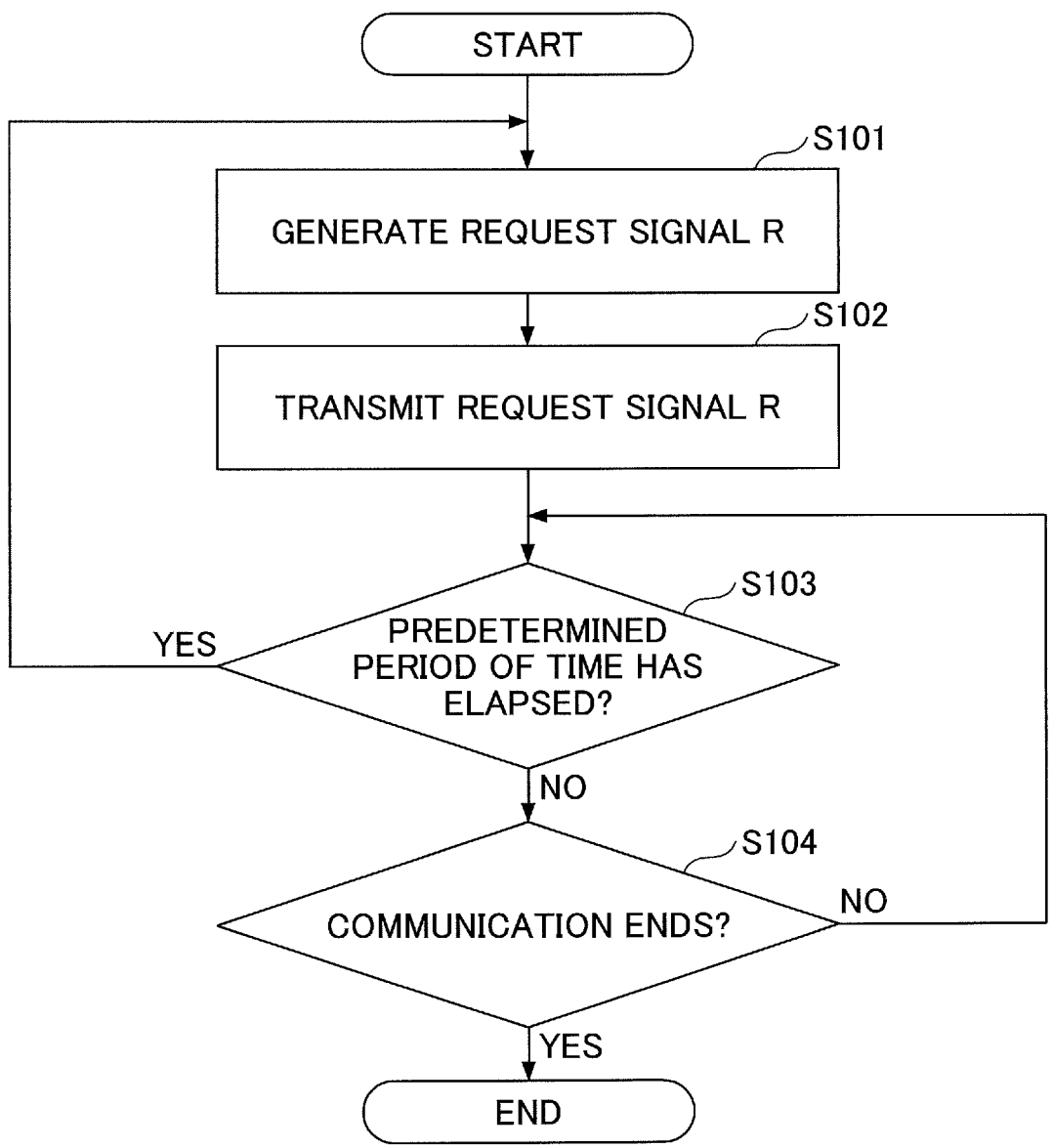
FIG. 3 is a flowchart illustrating an example of a process performed by an in-vehicle device to transmit a request signal R.

First, a process performed by the in-vehicle device 2 to transmit a request signal R will be described. FIG. 3 is a flowchart illustrating an example of a process performed by the in-vehicle device 2 to transmit a request signal R. The transmitting process illustrated in FIG. 3 is initialed upon the connection of the in-vehicle device 2 to the portable device 1. In the following, it is assumed that request signals R are transmitted in the order from the transmitting antennas A221 to A225.

Upon the connection of the in-vehicle device 2 to the portable device 1, the request signal generating unit 232 reads, from the in-vehicle device storage 231, the in-vehicle device ID, the portable device ID, and the antenna ID of the transmitting antenna A221 from which to transmit a request signal R1. Then, the request signal generating unit 232 generates a request signal R1 that includes the read in-vehicle device ID (transmission source), the portable device ID (transmission destination), the antenna ID, and a measurement portion (step S101). The request signal generating unit 232 inputs the generated request signal R1 into the in-vehicle device transmitter 22.

When the request signal R1 is input, the in-vehicle device transmitter 22 wirelessly transmits the input request signal R1 from the transmitting antenna A221 (step S102). The in-vehicle device transmitter 22 may refer to the antenna ID included in the request signal R1 to select the transmitting antenna A221 as a transmitting antenna A22 from which to transmit the request signal R1. Alternatively, the request signal generating unit 232 may instruct the in-vehicle device transmitter 22 to transmit the request signal R1 from the transmitting antenna A221.

When a predetermined period of time has elapsed after the transmission of the request signal R1 (yes in S103), the process returns to the step S101, and the request signal generating unit 232 generates a request signal R2. The in-vehicle device transmitter 22 wirelessly transmits the request signal R2 from the transmitting antenna A222. Subsequently, the in-vehicle device 2 sequentially transmits request signals R3 to R5 each time the predetermined period of time has elapsed. When the in-vehicle device 2 transmits the request signal R5, the in-vehicle device 2 transmits request signals again starting from a request signal R1. The in-vehicle device 2 repeats steps S101 to S103 until the communication with the portable device 1 ends. When the communication with the portable device 1 ends (yes in S104), the in-vehicle device 2 ends the transmitting process illustrated in FIG. 3.

With the above process, it becomes possible for the in-vehicle device transmitter 22 to transmit a request signal R from each of the plurality of the transmitting antennas A22 each time the predetermined period of time has elapsed. It should be noted that the order of transmitting request signals R from the transmitting antennas A22 may be set as desired.

Figure 4:
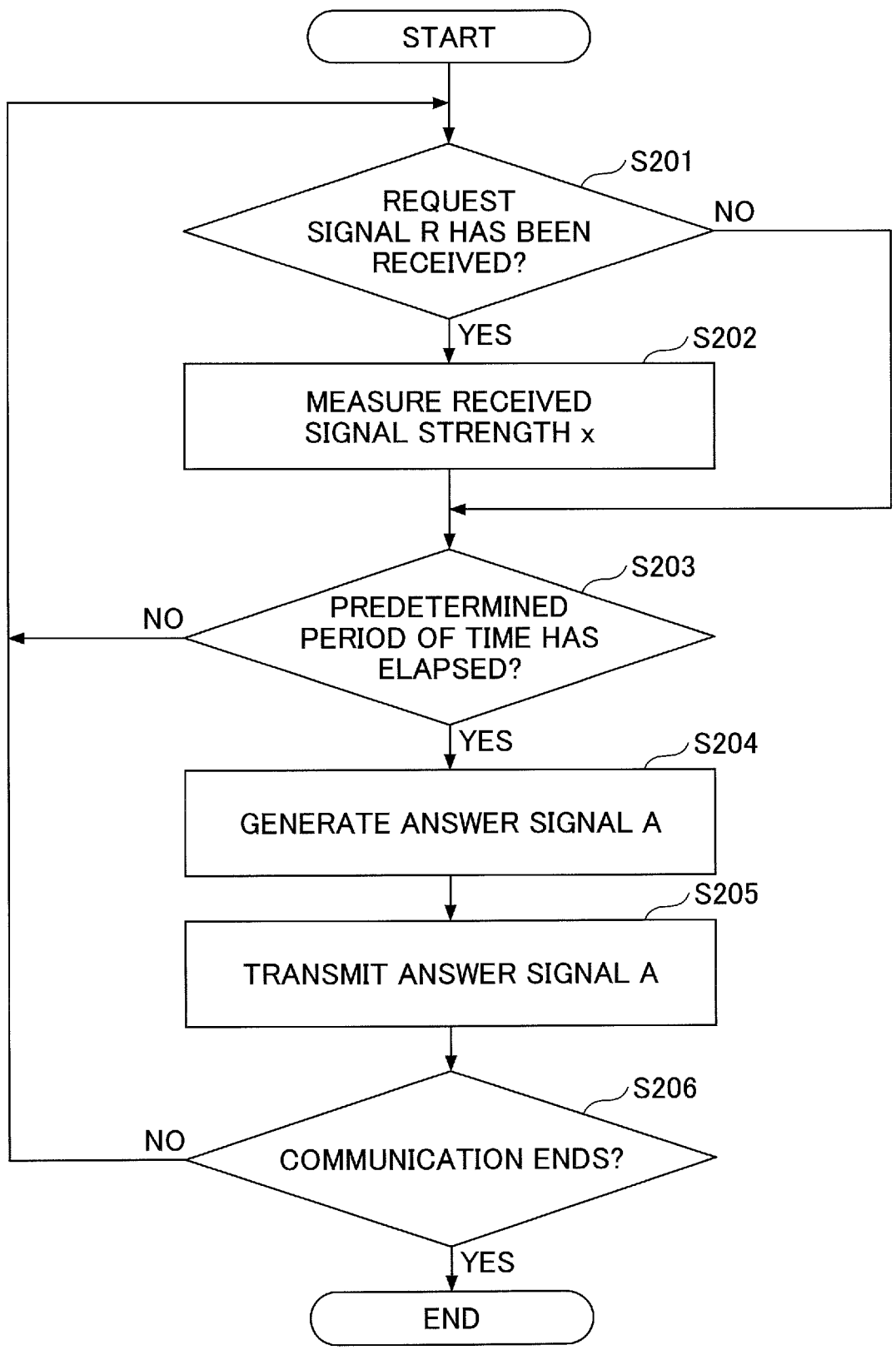
FIG. 4 is a flowchart illustrating an example of a transmitting/receiving process performed by a portable device.

Next, a transmitting/receiving process performed by the portable device 1 will be described. FIG. 4 is a flowchart illustrating an example of a transmitting/receiving process performed by the portable device 1. The transmitting/receiving process illustrated in FIG. 4 is initiated upon the connection of the portable device 1 to the in-vehicle device 2.

Upon the connection of the portable device to the in-vehicle device 2, the portable device receiver 11 starts receiving a request signal R from the in-vehicle device 2 (step S201). When a request signal R has been received from the in-vehicle device 2 (yes in step S201), the portable device receiver 11 inputs the received request signal R into the received signal strength measuring unit 133.

When the request signal R is input, the received signal strength measuring unit 133 measures a received signal strength x of (a measurement portion of) the input request signal R, associates the measured received signal strength x with an antenna ID included in the input request signal R, and inputs the received signal strength x into the answer signal generating unit 132 (step S202). The portable device 1 repeats steps S201 and S202 until a predetermined period of time has elapsed. The period of time during which the portable device receiver 11 receives request signals R is set, such that the request signals R1 to R5 can be received.

When the predetermined period of time has elapsed (yes in step S203), the answer signal generating unit 132 reads, from the portable device storage 131, the portable device ID and the in-vehicle device ID. The answer signal generating unit 132 then generates an answer signal A that includes the read portable device ID (transmission source) and the in-vehicle device ID (transmission destination), and also includes the signal strengths x that have been associated with the respective antenna IDs and input from the received signal strength measuring unit 133 for the predetermined period of time (step S204). The answer signal generating unit 132 inputs the generated answer signal A into the portable device transmitter 12.

When the answer signal A is input, the portable device transmitter 12 wirelessly transmits the input answer signal A from the transmitting antenna A12 (step S205). The portable device 1 repeats steps S201 to S205 until the communication with the in-vehicle device 2 ends. When the communication with the in-vehicle device 2 ends, the portable device 1 ends the transmitting/receiving process illustrated in FIG. 4.

With the above process, it becomes possible for the portable device 1 to transmit an answer signal A each time the predetermined period of time has elapsed. When the portable device receiver 11 receives the request signals R1 to R5 from the transmitting antennas A221 to A225 during the predetermined period of time, the answer signal A includes the signal strengths x1 to x5 of all the received request signals R1 to R5. Conversely, when the portable device receiver 11 is unable to receive request signals R from one or more transmitting antennas A22, the answer signal A does not include signal strengths x of the request signals R transmitted from the one or more transmitting antennas A22.

Figure 5:
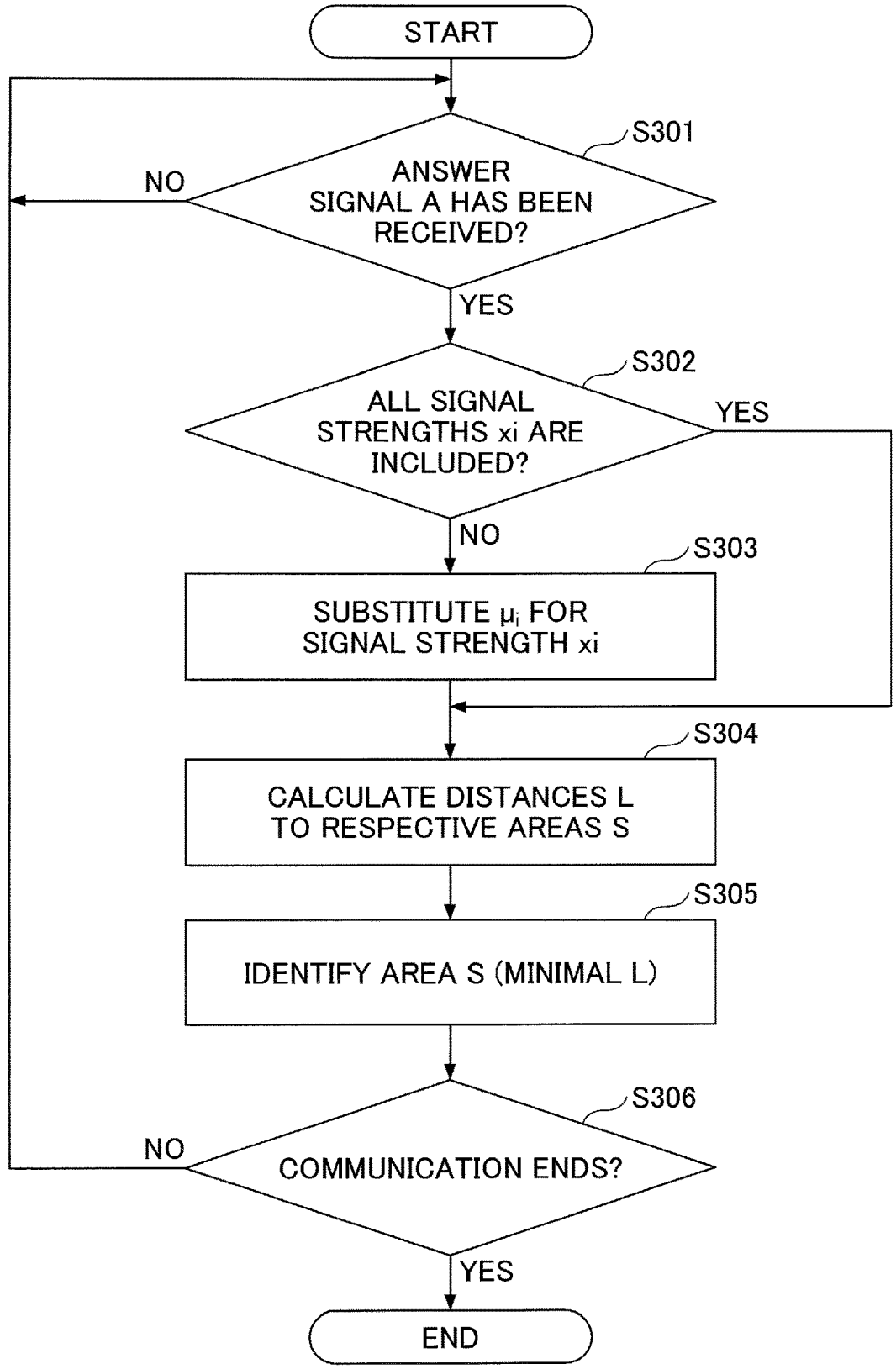
FIG. 5 is a flowchart illustrating an example of a process performed by the in-vehicle device to receive an answer signal A.

Next, a process performed by the in-vehicle device 2 to receive an answer signal A will be described. FIG. 5 is a flowchart illustrating an example of a process performed by the in-vehicle device 2 to receive an answer signal A. The receiving process illustrated in FIG. 5 is initiated upon the connection of the in-vehicle device 2 to the portable device 1. It should be noted that the receiving process illustrated in FIG. 5 may be performed concurrently with the transmitting process illustrated in FIG. 3, or the receiving process illustrated in FIG. 5 and the transmitting process illustrated in FIG. 3 may be alternately performed. Further, distances L are assumed to be Mahalanobis distances.

Upon the connection of the in-vehicle device 2 to the portable device 1, the in-vehicle device receiver 21 starts receiving an answer signal A from the portable device 1 (step S301). When an answer signal A has been received from the portable device 1 (yes in step S301), the in-vehicle device receiver 21 inputs the received answer signal A into the distance calculating unit 233.

When the answer signal A is input, the distance calculating unit 233 refers to signal strengths xi and antenna IDs included in the input answer signal A, and checks whether the signal strengths xi of all the request signals Ri are included (step S302). In other words, the distance calculating unit 233 checks whether there is any request signal Ri whose signal strength xi is not included in the input answer signal A.

If all the antenna IDs are preliminarily registered in the portable device 1, the answer signal A includes all the antenna IDs. If the portable device 1 fails to receive a request signal Ri, an antenna ID included in the request signal Ri indicates a null in the answer signal A.

FIG. 6 is a table illustrating an example of received signal strengths x included in an answer signal A. In the example of FIG. 6, it is assumed that the portable device 1 fails to receive the request signal R1 from the transmitting antenna A221. As illustrated in FIG. 6, if the portable device 1 fails to receive the request signal R1, an antenna ID "A221" included in the request signal R1 indicates a null as a received signal strength x. In this case, the distance calculating unit 233 can check whether the received signal strengths xi of all the request signals Ri are included in the answer signal A by referring to values of the received signal strengths x associated with the respective antenna IDs.

Conversely, if all the antenna IDs are not preliminarily registered in the portable device 1, the answer signal A includes only antenna IDs included in request signals Ri received by the portable device 1. In other words, if the portable device 1 fails to receive a request signal Ri, the answer signal A does not include an antenna ID included in the request signal Ri.

FIG. 7 is a table illustrating an example of received signal strengths x included in an answer signal A. In the example of FIG. 7, it is assumed that the portable device 1 fails to receive the request signal R1 from the transmitting antenna A221. As illustrated in FIG. 7, if the portable device 1 fails to receive the request signal R1, the answer signal A does not include either the antenna ID "A221" or the received signal strength "x1". In this case, the distance calculating unit 233 can check whether the received signal strengths xi of all request signals Ri are included in the answer signal A by comparing the antenna IDs stored in the in-vehicle device storage 231 to antenna IDs included in the answer signal A.

If the received signal strengths xi of all the request signals Ri are included in the answer signal A (yes in step S302), the distance calculating unit 233 reads, from the in-vehicle device storage 231, the reference values p, and the coefficients $r_{ij}$ set for the areas S, and substitutes the reference values $\mu_i$, the coefficients $r_{ij}$, and the signal strengths xi of the received request signals Ri into the formula (1). In this way, the distance calculating unit 233 calculates distances L from the portable device 1 to the areas S (step S304).

Conversely, if a signal strength xi of any request signal Ri is not included in the answer signal A, namely if there is a request signal Ri whose received signal strength xi is not included in the answer signal A (no in step S302), the distance calculating unit 233 reads the reference values $\mu_i$ and the coefficients $r_{ij}$ set for the areas S from the in-vehicle device storage 231. The distance calculating unit 233 then substitutes a reference value $\mu_i$ set for a corresponding area Sj for the signal strength xi (step S303). In the examples of FIG. 6 and FIG. 7, in order to calculate a distance L from the portable device 1 to the area S1, the reference value $\mu_1$ set for the area S1 is substituted for the signal strength x1.

The distance calculating unit 233 substitutes the reference values $\mu_i$, the coefficients $r_{ij}$, and the signal strengths xi included in the answer signal A, one of the signal strengths xi being substituted with the reference value $\mu_i$, into the formula (1), and calculates the distances L from the portable device 1 to the areas S (step S304).

When the distances L from the portable device 1 to the areas S are calculated, the distance calculating unit 233 inputs the calculated distances L into the area identifying unit 234.

When the distances L are input, the area identifying unit 234 identifies an area S to which the portable device 1 belongs, namely an area where the portable device 1 is located (step S305). For example, from the distances L1 to L4, if the distance L1 is minimal, the area S1 is identified as an area S to which the portable device 1 belongs.

The in-vehicle device 2 repeats steps S301 to S305 until the communication with the portable device 1 ends. When the communication with the portable device 1 ends (yes in step S306), the in-vehicle device 2 ends the receiving process illustrated in FIG. 5.

With the above process, the in-vehicle device 2 can identify an area S to which the portable device 1 belongs (namely, the location of the portable device 1), based on received signal strengths x included in an answer signal A each time an answer signal A is received. After identifying the area S to which the portable device 1 belongs, the in-vehicle device 2 may request the ECU of the vehicle to perform control according to the identified area S. For example, when the portable device 1 belongs to an area S located in the vicinity of the vehicle, the in-vehicle device 2 may request the ECU to unlock the vehicle. In addition, depending on the area S, it is possible to request the ECU to turn lamps on or off or to unlock the vehicle.

As described above, according to the present embodiment, even if the portable device 1 is unable to receive any request signal Ri due to a malfunction or a communication failure of a transmitting antennas A22, and thus a signal strength xi of the request signal Ri is not included in an answer signal A, the in-vehicle device 2 can calculate the distances L from the portable device 1 to the areas S by substituting a reference value $\mu_i$ for the signal strength xi and using the reference value $\mu_i$ together with signal strengths xi of the other request signals Ri included in the answer signal A. Accordingly, it is possible to provide the keyless entry system 100 that can identify the location of the portable device 1 even if a signal strength xi of any request signal R is not obtained.

Further, according to the present embodiment, even if any signal strength xi is not included in an answer signal A, the distances L are calculated with the same calculation method (the formula (1) or the formula (4)) as when all signal strengths xi are included in the answer signal A. Accordingly, there is no need to provide a separate calculation method for calculating the distances L when any signal strength xi is not included in an answer signal A. Thus, as compared to the above-described first approach, the calculation method according to the present embodiment can be easily implemented.

Further, according to the present embodiment, if a signal strength xi is not included in an answer signal A, the term $(x_i-\mu_i)$ corresponding to a difference between the signal strength xi and the reference value $\mu_i$ disappears by substituting the reference value $\mu_i$ for the signal strength xi. Accordingly, the method for calculating distances L according to the present embodiment makes it possible to reduce the calculation amount and improve the processing speed.

Figure 8:
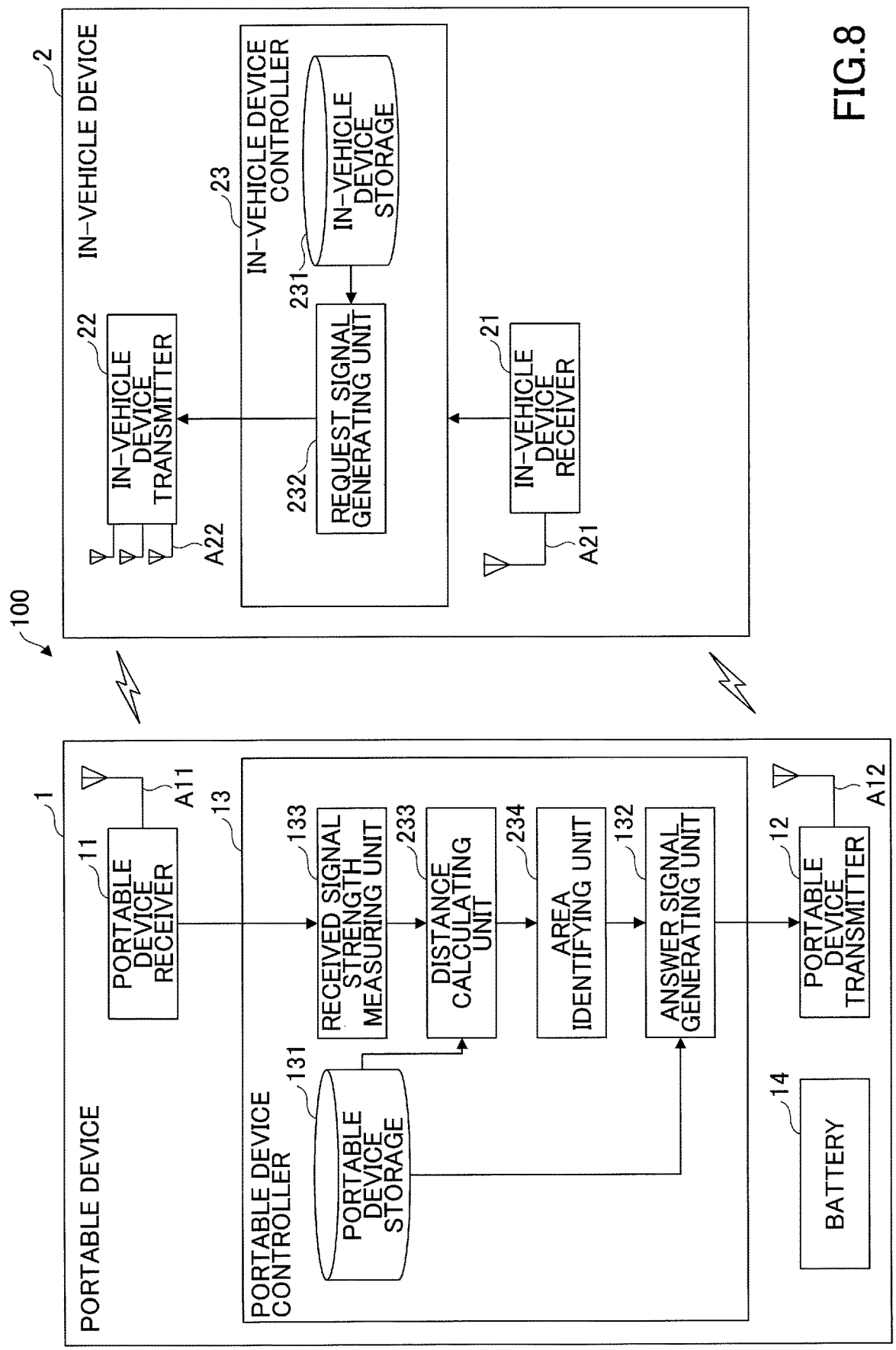
FIG. 8 is a diagram illustrating a first variation of the keyless entry system.

FIG. 8 is a diagram illustrating a first variation of the keyless entry system 100 according to the present embodiment. In the first variation, the distance calculating unit 233 and the area identifying unit 234 are provided in the portable device controller 13. The distance calculating unit 233 and the area identifying unit 234 are implemented by causing the CPU of the portable device controller 13 to execute a program and work with other hardware. In addition, the portable device storage 131 stores reference values and coefficients for calculating the distances L.

In the first variation, signal strengths x measured by the received signal strength measuring unit 133 are input into the distance calculating unit 233, and based on the input signal strengths x and also the reference values $\mu_i$ and the coefficients $r_{ij}$ stored in the portable device storage 131, the distance calculating unit 233 calculates the distances L from the portable device to the areas S. The area identifying unit 234 identifies an area S to which the portable device 1 belongs, based on the distances L calculated by the distance calculating unit 233. The answer signal generating unit 132 wirelessly transmits, to the in-vehicle device 2, an answer signal A that includes the identified area S to which the portable device 1 belongs.

According to the first variation, even if the portable device 1 is unable to receive any request signal Ri from the in-vehicle device 2 due to a malfunction or a communication failure of a transmitting antenna A22, and is thus unable to obtain a signal strength xi of the request signal Ri, the portable device 1 can identify an area S to which the portable device 1 belongs by substituting a corresponding reference value $\mu_i$ for the signal strength xi and calculating the distances L from the portable device 1 to the areas S. Namely, it is possible to provide the keyless entry system 100 that can identify the location of the portable device 1 even if a signal strength xi of any request signal R is not obtained.

Figure 9:
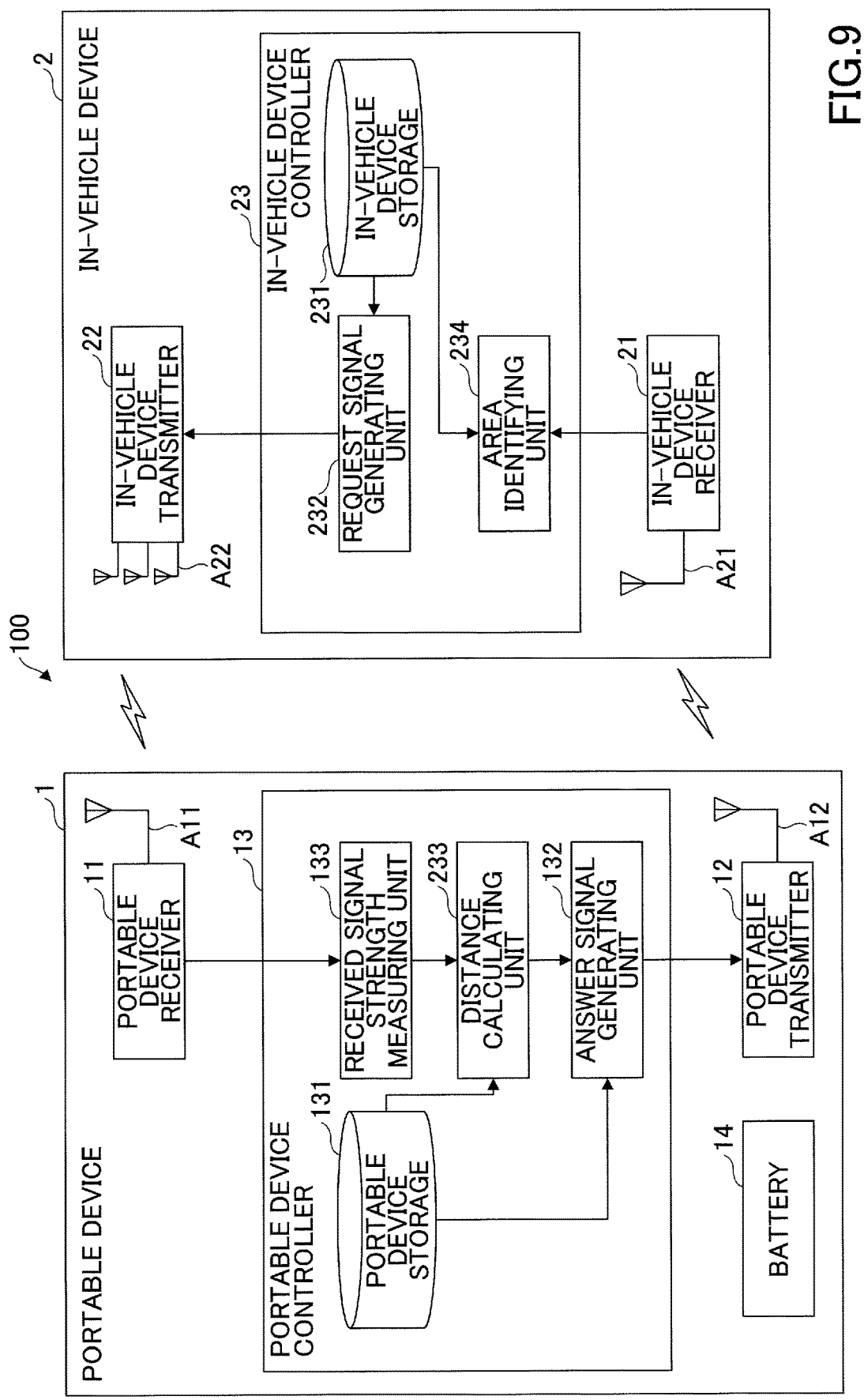
FIG. 9 is a diagram illustrating a second variation of the keyless entry system.

FIG. 9 is a diagram illustrating a second variation of the keyless entry system 100 according to the present embodiment. In the second variation, the distance calculating unit 233 is provided in the portable device controller 13. The distance calculating unit 233 is implemented by causing the CPU of the portable device controller 13 to execute a program and work with other hardware. In addition, the portable device storage 131 preliminarily stores reference values and coefficients for calculating the distances L.

In the second variation, signal strengths x measured by the received signal strength measuring unit 133 are input into the distance calculating unit 233, and based on the input signal strengths x and also the reference values $\mu_i$ and the coefficients $r_{ij}$ stored in the portable device storage 131, the distance calculating unit 233 calculates the distances L from the portable device 1 to the areas S. The answer signal generating unit 132 wirelessly transmits, to the in-vehicle device 2, an answer signal A that includes the distances L calculated by the distance calculating unit 233. When the in-vehicle device receiver 21 receives the answer signal A from the portable device 1, the area identifying unit 234 identifies an area S to which the portable device 1 belongs based on the distances L included in the answer signal A.

According to the second variation, even if the portable device 1 is unable to receive any request signal Ri from the in-vehicle device 2 due to a malfunction or a communication failure of a transmitting antenna A22, and is thus unable to obtain a signal strength xi of the request signal Ri, the portable device 1 can calculate the distances L from the portable device 1 to the areas S by substituting a corresponding reference value $\mu_i$ for the signal strength xi. Further, the in-vehicle device 2 can identify an area S to which the portable device 1 belongs, based on the distances L included in the answer signal A received from the portable device 1. Namely, it is possible to provide the keyless entry system 100 that can identify the location of the portable device 1 even if a signal strength xi of any request signal R is not obtained.

Figure 10:
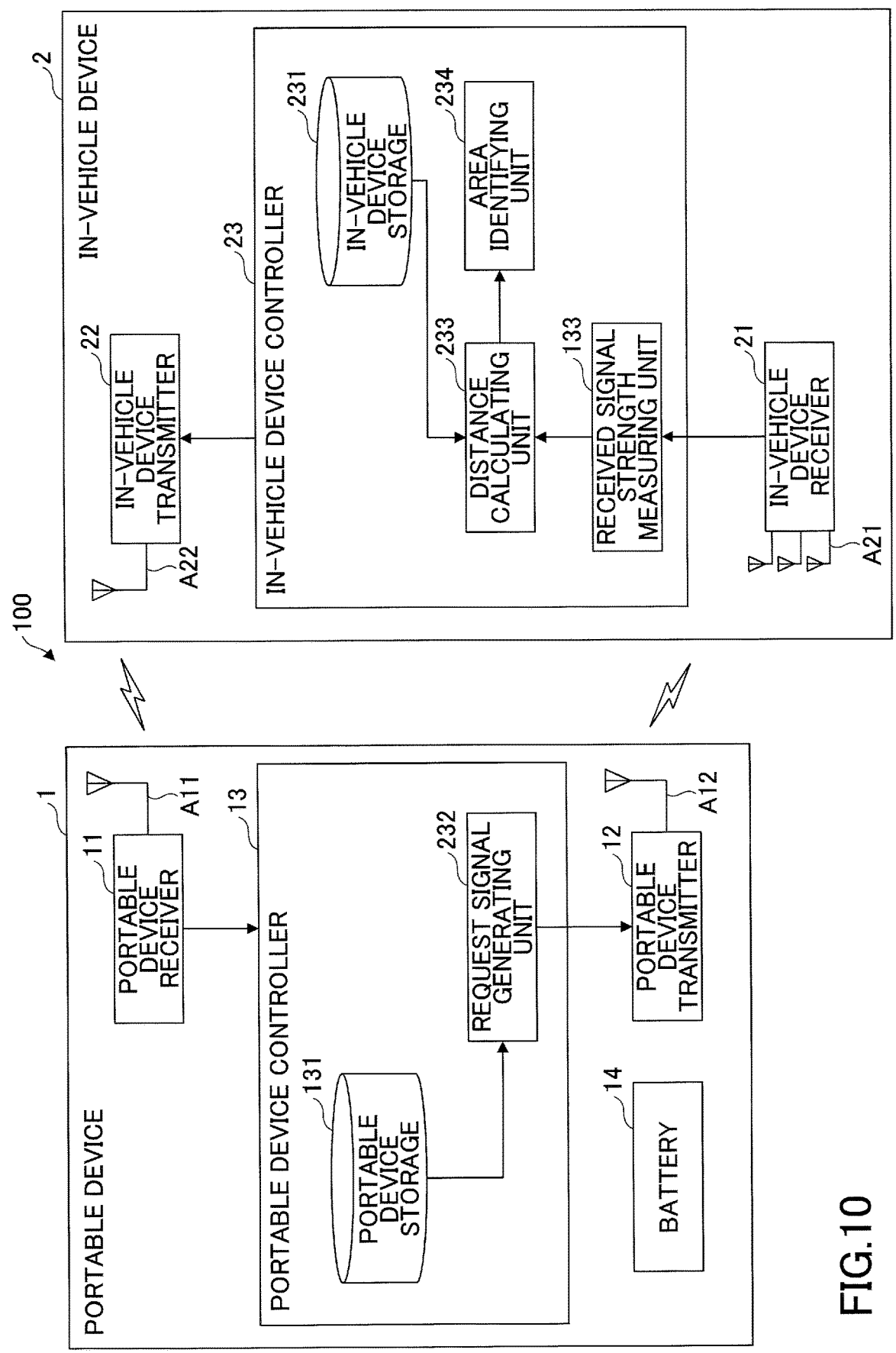
FIG. 10 is a diagram illustrating a third variation of the keyless entry system.

FIG. 10 is a diagram illustrating a third variation of the keyless entry system 100 according to the present embodiment. In the third variation, the received signal strength measuring unit 133 is provided in the in-vehicle device controller 23. The received signal strength measuring unit 133 is implemented by causing the CPU of the in-vehicle device controller 23 to execute a program and work with other hardware. Further, the request signal generating unit 232 is provided in the portable device controller 13. The request signal generating unit 232 is implemented by causing the CPU of the portable device controller 13 to execute a program and work with other hardware. In addition, the in-vehicle device 2 includes a plurality of receiving antennas A21. In the third variation, the number of transmitting antennas A22 may be one.

In the third variation, the request signal generating unit 232 generates request signals R that each include a measurement portion. The portable device transmitter 12 wirelessly transmits the request signals R generated by the request signal generating unit 232 to the in-vehicle device 2. The in-vehicle device receiver 21 receives the request signals R, which have been transmitted from the portable device transmitter 12, via the respective receiving antennas A21, and inputs the request signals R received via the respective receiving antennas A21 into the received signal strength measuring unit 133. The received signal strength measuring unit 133 measures, on a per-receiving-antenna A21 basis, signal strengths x of the received request signals R that have been input from the in-vehicle device receiver 21, and inputs the signal strengths into the distance calculating unit 233. The distance calculating unit 233 calculates the distances L from the portable device 1 to the areas S, based on the signal strengths x, which have been measured on a per-receiving-antenna A21 basis and have been input from the received signal strength measuring unit 133, and also reference values $\mu_i$ and coefficients $r_{ij}$ stored in the in-vehicle device storage 231.

According to the third variation, even if the in-vehicle device 2 is unable to receive any request signal Ri from the portable device 1 due to a malfunction or a communication failure of a receiving antenna A21, and is thus unable to obtain a signal strength xi of the request signal Ri, the in-vehicle device 2 can identify an area S to which the portable device 1 belongs by substituting a corresponding reference value $\mu_i$ for the signal strength xi and calculating the distances L from the portable device 1 to the areas S. Namely, it is possible to provide the keyless entry system 100 that can identify the location of the portable device 1 even if a signal strength xi of any request signal R is not obtained.

According to at least one embodiment, it is possible to provide a keyless entry system in which even if a signal strength of any request signal is not obtained, the location of a portable device can be identified based on signal strengths of other received request signals.

Further, the present invention is not limited to the configurations described herein, and other elements may be combined with the above-described configurations. Various variations and modifications may be made without departing from the scope of the present invention.

What is claimed is:

1. An in-vehicle device associated with a vehicle, comprising:
    a plurality of transmitting antennas;
    an in-vehicle device transmitter to transmit request signals via the plurality of respective transmitting antennas;
    an in-vehicle device receiver to receive, from a portable device, an answer signal that includes received signal strengths of the respective request signals that have been transmitted from the plurality of respective transmitting antennas; and
    an in-vehicle device controller to calculate a distance from the portable device to each of a plurality of predetermined areas surrounding the vehicle, based on both the received signal strengths of the respective request signals included in the answer signal and reference values for the received signal strengths of the respective request signals, the reference values being preliminarily set for the plurality of respective predetermined areas, and to identify an area to which the portable device belongs from the plurality of predetermined areas based on the distance,
    wherein, in a case where there is a request signal whose received signal strength is not included in the answer signal, the in-vehicle device controller calculates the distance by utilizing a corresponding reference value for the request signal as the received signal strength of the request signal, the corresponding reference value being from among the reference values.

2. The in-vehicle device according to claim 1, wherein the distance is a Mahalanobis distance or a Euclidean distance.

3. The in-vehicle device according to claim 1, wherein each of the reference values is an average value of a plurality of received signal strengths for a request signal as preliminarily measured by measuring instruments belonging to each predetermined area of the plurality of respective predetermined areas, the request signal being from among the respective request signals.

4. The in-vehicle device according to claim 1, wherein the in-vehicle device transmitter includes one in-vehicle device transmitter connected to the plurality of transmitting antennas.

5. The in-vehicle device according to claim 1, wherein the in-vehicle device transmitter includes a plurality of in-vehicle device transmitters each connected to a corresponding transmitting antenna of the plurality of transmitting antennas.

6. A non-transitory recording medium storing a program for causing an in-vehicle device controller of an in-vehicle device to execute a process comprising:
    transmitting, by an in-vehicle transmitter of the in-vehicle device associated with a vehicle, request signals from a plurality of respective transmitting antennas;
    receiving, from a portable device, an answer signal that includes received signal strengths of the respective request signals that have been transmitted from the plurality of respective transmitting antennas;
    calculating, by the in-vehicle device controller, a distance from the portable device to each of a plurality of predetermined areas surrounding the vehicle, based on both the received signal strengths of the respective request signals included in the answer signal and reference values for the received signal strengths of the respective request signals, the reference values being preliminarily set for the plurality of respective predetermined areas, and identifying an area to which the portable device belongs from the plurality of predetermined areas based on the distance; and
    in a case where there is a request signal whose received signal strength is not included in the answer signal, calculating the distance by utilizing a corresponding reference value for the request signal as the received signal strength of the request signal, the corresponding reference value being from among the reference values.

7. A keyless entry system including a portable device and an in-vehicle device associated with a vehicle, the keyless entry system comprising:
    a received signal strength measuring unit, of the portable device, to measure received signal strengths of a plurality of request signals that have been transmitted from respective different transmitting antennas, connected to an in-vehicle device transmitter on the in-vehicle device, or that have been received at respective different receiving antennas of the portable device;

a portable device transmitter to transmit an answer signal that includes the received signal strengths of the respective request signals;

a distance calculating unit of the in-vehicle device, in response to receiving the answer signal from the portable device, to calculate a distance from the portable device to each of a plurality of predetermined areas surrounding the vehicle, based on both the received signal strengths of the respective request signals included in the answer signal and reference values for the received signal strengths of the request signals, the reference values being preliminarily set for the plurality of respective predetermined areas; and an area identifying unit of the in-vehicle device to identify an area to which the portable device belongs from the plurality of predetermined areas based on the distance, wherein, in a case where there is a request signal whose received signal strength has not been measured in the answer signal, the distance calculating unit calculates the distance by utilizing a corresponding reference value for the request signal as the received signal strength of the request signal, the corresponding reference value being from among the reference values.

* * * * *